2,991,242
CATALYTIC HYDROGEN TRANSFER PROCESS

Peter D. Branton and Charles J. Plank, Woodbury, N.J., assignors to Socony Mobil Oil Company, Inc., a corporation of New York
No Drawing. Filed Oct. 17, 1958, Ser. No. 767,761
6 Claims. (Cl. 208—134)

This invention relates to a process for altering the ratio of hydrogen to carbon in a hydrocarbon charge material. More particularly, the present invention is concerned with catalytic hydrocarbon conversion processes involving the transfer of hydrogen between a hydrogen-rich hydrocarbon and a hydrogen-poor hydrocarbon. Exemplary of such processes are aromatization, dehydrogenation and reforming reactions in which hydrocarbon naphtha fractions undergo conversion to yield a high recovery of liquid products of improved octane number.

In accordance with the present invention, the hydrocarbon charge undergoing treatment is contacted under conversion conditions with a catalyst consisting essentially of activated charcoal impregnated with a minor proportion of a compound of calcium.

One embodiment of the invention resides in reforming petroleum naphtha fractions under reforming conditions including a temperature between about 800° F. and about 1100° F. and usually a temperature between about 850° F. and about 975° F.; a pressure within the range of about 100 to about 1000 pounds per square inch gauge and more usually between about 200 and about 700 pounds per square inch gauge; a liquid hourly space velocity, i.e. the liquid volume of hydrocarbon per hour per volume of catalyst is between about 0.1 and about 10 and usually between 0.5 and about 4. The molar ratio of hydrogen to hydrocarbon charge employed is between about 1 and about 20 and usually between about 4 and about 12. The hydrocarbon charge stocks undergoing reforming comprise mixtures of hydrocarbons and particularly petroleum distillates boiling within the approximate range of 60° F. to 450° F., which range includes naphthas, gasolines and kerosene. The gasoline fraction may be a full boiling range gasoline but generally is a naphtha having an initial boiling point of between about 150° F. and about 250° F. and an end boiling point of between about 350° F. and about 425° F. Such stock is according to the present invention contacted under the above-noted conditions with a catalyst of activated charcoal impregnated with a minor proportion, generally in the range of 0.1 to 10 percent, by weight of a compound of calcium. The hydrocarbons boiling in the gasoline range are recovered from the reaction mixture. The catalyst is periodically regenerated with steam at an elevated temperature.

In another embodiment, the invention comprises conducting hydrogen transfer reactions in which hydrogen undergoes transformation from a hydrogen-rich hydrocarbon, such as a cycloparaffin to a hydrogen-poor hydrocarbon, such as an olefin leading to the formation of an aromatic and a paraffin hydrocarbon respectively. Typical is the reaction of methylcyclohexane and propylene to yield toluene and propane. Such reactions are generally carried out at a temperature between 800° F. and 1100° F., employing an olefin to cycloparaffin ratio of about 0.5 to about 5 and a contact time of about 0.1 to about 10 seconds. A catalyst of activated charcoal impregnated with the above specified minor proportion of a calcium compound has, in accordance with the present invention, been found to be unusual, as compared with activated charcoal composites containing small amounts of other alkaline earth or alkali metal compounds in providing a catalytic composite of high activity with accompanying good selectivity.

Thus, it has heretofore been known that activated charcoal promotes hydrogen transfer reactions. The extent of reaction varies, as is to be expected, with the nature of the reactant charge and with operating conditions, such as temperature and contact time. The process is, however, complicated by a rather extensive amount of cracking, which results in the production of light gaseous hydrocarbons, hydrogen, paraffins and olefins having a lower carbon content than the charge, as well as some polymeric material.

It has been discovered with the present invention that impregnation of activated charcoal with a minor amount of a calcium compound is specific in improving the activity as well as the selectivity of such material as a catalyst for hydrogen transfer reactions. Thus, it has been found that a compound of calcium, generally in the form of its oxide, hydroxide or carbonate, when composited with activated charcoal promotes the same to yield a catalyst of improved activity while retaining a good selectivity at a low cracking level. A substantially less marked effect is shown by impregnation of activated charcoal with a corresponding lithium compound at the same reaction conditions. Impregnation of activated charcoal with a corresponding sodium compound affords only a slight improvement, while impregnation with a potassium compound results in an actually lowered activity as compared with the untreated charcoal. Impregnation of activated charcoal with a magnesium compound results in a composite exhibiting high activity but poor selectivity, the effect of the additional magnesium compound being mainly one of enhancing cracking.

The catalyst utilized in the process of the invention accordingly is a high area activated charcoal, characterized by a surface area of at least about 100 square meters per gram and preferably in excess of 500 square meters per gram, having deposited thereon a minor proportion, i.e. between about 0.1 and about 10 percent by weight of a compound of calcium. Generally, an inorganic compound of calcium will be employed for effecting the desired impregnation. In particular, the catalyst is prepared by depositing calcium on the charcoal in the form of its oxide, hydroxide, or carbonate, added or formed in situ; followed by washing and drying to yield a composite of calcium compound in intimate combination with the activated charcoal.

The examples set forth hereinbelow will serve to illustrate the process of the invention without limiting the same. In these examples activated charcoal, type BPL, catalyst grade, manufactured by the Pittsburgh Coke and Chemical Company, was used. This charcoal had a reported surface area of 1100 square meters per gram.

EXAMPLE 1

Activated charcoal was impregnated with 0.5 milliequivalent per gram of lithium hydroxide and thereafter dried in air for 16 hours at 230° F. The resulting catalytic composite was used in converting a mixture of propylene and methylcyclohexane under reaction conditions described hereinbelow.

EXAMPLE 2

Activated charcoal was impregnated with 0.5 milliequivalent per gram of sodium hydroxide and thereafter dried 16 hours in air at 280° F. The resulting catalytic composite was used in converting a mixture of propylene and methylcyclohexane under reaction conditions described hereinbelow.

EXAMPLE 3

Activated charcoal was impregnated with 0.5 milliequivalent per gram of potassium hydroxide and thereafter dried in air for 16 hours at 280° F. The resulting catalytic composite was used in converting a mixture of propylene and methylcyclohexane under reaction conditions described hereinbelow.

EXAMPLE 4

Activated charcoal was impregnated with 0.5 milliequivalent per gram of calcium nitrate and thereafter dried in air for 16 hours at 280° F. The product obtained was then treated with a 2 N ammonia solution, dried in air for 16 hours at 280° F., washed with a weak aqueous solution of ammonium carbonate, washed with water and finally dried in air for 68 hours at 280° F. The resulting composite was used in converting a mixture of propylene and methylcyclohexane under reaction conditions described hereinbelow. Another portion was used in reforming a Mid-Continent naphtha under reaction conditions described in Example 6.

EXAMPLE 5

Activated charcoal was impregnated with 0.5 milliequivalent per gram of magnesium nitrate, dried in air for 16 hours at 280° F. The product obtained was treated with a 2 N ammonia solution, dried in air for 16 hours at 280° F., washed with a weak aqueous solution of ammonia, washed with water and finally dried in air for 68 hours at 280° F. The resulting composite was used in converting a mixture of propylene and methylcyclohexane under reaction conditions described hereinbelow.

A mixture of propylene and methylcyclohexane in a molar ratio of 1.3:1 was passed over each of the catalysts of the above examples at a temperature of 900° F., at atmospheric pressure and at a flow rate to give a residence time of 1.3 seconds over the catalyst.

The following Table I summarizes the results of these runs and includes for comparison, corresponding results obtained with an unpromoted activated charcoal sample.

Table I

| Example No | | 1 | 2 | 3 | 4 | 5 |
|---|---|---|---|---|---|---|
| Catalyst | Unpromoted Activated Charcoal | Li Compound | Na Compound | K Compound | Ca Compound | Mg Compound |
| Methylcyclohexane converted, percent | 44.9 | 53.3 | 47.4 | 39.1 | 61.6 | 68.3 |
| Toluene, Mol/100 Mol Methylcyclohexane converted | 87.8 | 83.9 | 86.2 | 76.1 | 84.6 | 50.4 |
| Toluene Yield, percent Mol based on feed | 39.4 | 44.6 | 40.9 | 29.8 | 52.3 | 34.2 |
| Mol Methylcyclohexane cracked/100 mol converted | 4.5 | 10.2 | 6.3 | 9.9 | 9.8 | 45.9 |

The above data illustrate the specific effectiveness of a catalyst of activated charcoal impregnated with a calcium compound as compared with corresponding composites of activated charcoal and the other above shown alkaline earth and alkali metal compounds. In particular, it will be seen from the above table that the catalyst of activated charcoal impregnated with the calcium compound affords a composite of improved conversion activity while retaining a good selectivity to toluene at a low cracking level.

The following example will serve to illustrate reforming of a petroleum naphtha utilizing a catalyst of activated charcoal impregnated with a compound of calcium.

EXAMPLE 6

A Mid-Continent naphtha having a boiling range of 180° to 380° F. was charged separately over a catalyst of an unpromoted activated charcoal and over a catalyst of activated charcoal promoted with 0.5 milliequivalent per gram of calcium oxide (the catalyst of Example 4). The operating conditions involved were those of reforming and included a 75 cc. sample of the catalyst; a temperature of 960° F.; a liquid hourly space velocity of 2; a pressure of 500 pounds per square inch gauge and a hydrogen to naphtha mol ratio of 10 to 1. For purposes of comparison, with thermal reforming under identical conditions a separate run was made in which the catalyst space was filled with inert "Vycor" glass chips. The leaded research octane number of the stablized reformates were determined and these octane numbers and the yields of $C_4+$ gasoline produced are set forth in Table II below.

The thermal reforming data were obtained by averaging the results of two successive one-hour runs. The catalytic runs are carried out continuously for about 50 hours to enable observation of the relative againg of the activated charcoal catalysts.

The results obtained are set forth below:

Table II

| | Thermal (Vycor) | Activated Charcoal | | | Activated Charcoal+0.5 meq. CaO/g. | | |
|---|---|---|---|---|---|---|---|
| Time (hrs.) | 1-2 | 2 | 26 | 50 | 1 | 25 | 49 |
| Octane No. (Research with 3 cc. TEL) | [1] 73.3 | 89.2 | 84.7 | 82.5 | 88.6 | 86.2 | 85.1 |
| $C_4+$ Gasoline (Vol. percent) | 100.4 | 90.0 | 95.2 | 95.3 | 90.2 | 92.6 | 94.2 |

[1] Original octane number of naphtha=60.

The above results show that both activated charcoal and calcium oxide-promoted activated charcoal are active for reforming compared to thermal reforming. It will be noted, however, that the activated charcoal promoted with calcium oxide retains its activity for reforming naphtha much better than does the unpromoted activated charcoal. Thus, the activity of the calcium oxide promoted charcoal catalyst is 1.5 octane numbers higher at the end of about 1 day and 2.6 octane numbers higher after about 2 days. Furthermore, the calcium oxide promoted charcoal affords essentially the same yield of $C_4+$ gasoline at about 85 octane number as the unpromoted charcoal while retaining its higher activity level.

We claim:

1. A method for altering the ratio of hydrogen to carbon in a hydrocarbon charge selected from the group consisting of: (1) a mixture of a cycloparaffin and an olefin and (2) a petroleum distillate boiling within the approximate range of 60° F. to 450° F. which comprises bringing said hydrocarbon charge into contact with a catalyst consisting essentially of activated charcoal impregnated with between about 0.1 and about 10 percent by weight of calcium oxide at a temperature between about 800° F. and about 1100° F.

2. A method for conducting hydrogen transfer reactions which comprises contacting a hydrocarbon mixture containing a cycloparaffin and an olefin with a catalyst consisting essentially of activated charcoal impregnated with between about 0.1 and about 10 percent by weight of calcium oxide at a temperature between 800° F. and 1100° F., employing an olefin to cycloparaffin ratio of about 0.5 to about 5 and a contact time of about 0.1 to about 10 seconds to yield a resulting product comprising an aromatic and a paraffin hydrocarbon.

3. A method for reforming a petroleum distillate boiling within the approximate range of 60° F. to 450° F. which comprises contacting the same at a temperature between about 800° F. and about 1100° F., a pressure between about 100 and about 1000 p.s.i.g., a liquid hourly space velocity of between about 0.1 and about 10, utilizing a molar ratio of hydrogen to hydrocarbon between about 1 and about 20 with a catalyst consisting essentially of activated charcoal impregnated with between about 0.1 and about 10 percent by weight of calcium oxide and recovering hydrocarbons in the gasoline range from the resulting reaction mixture.

4. A method for altering the ratio of hydrogen to carbon in a hydrocarbon charge selected from the group consisting of: (1) a mixture of methylcyclohexane and propylene and (2) a petroleum naphtha having a boiling range of 180° F. to 380° F. which comprises bringing said hydrocarbon charge into contact with a catalyst consisting essentially of activated charcoal impregnated with between about 0.1 and about 10 percent by weight of calcium oxide at a temperature between about 800° F. and about 1100° F.

5. A method for conducting hydrogen transfer reactions which comprises contacting a hydrocarbon mixture containing methylcyclohexane and propylene with a catalyst consisting essentially of activated charcoal impregnated with between about 0.1 and about 10 percent by weight of calcium oxide at a temperature between 800° F. and 1100° F., employing an olefin to cycloparaffin ratio of about 0.5 to about 5 and a contact time of about 0.1 to about 10 seconds to yield a resulting product comprising toluene and propane.

6. A method for reforming a petroleum naphtha having a boiling range of 180° F. to 380° F. which comprises contacting the same at a temperature between about 800° F. and about 1100° F., a pressure between about 100 and about 1000 p.s.i.g., a liquid hourly space velocity of between about 0.1 and about 10, utilizing a molar ratio of hydrogen to hydrocarbon between about 1 and about 20 with a catalyst consisting essentially of activated charcoal impregnated with between about 0.1 and about 10 percent by weight of calcium oxide and recovering hydrocarbons in the gasoline range from the resulting reaction mixture.

References Cited in the file of this patent
UNITED STATES PATENTS

| | | |
|---|---|---|
| 2,127,953 | Drennan | Aug. 23, 1938 |
| 2,312,560 | Kropi | Mar. 2, 1943 |
| 2,481,300 | Engel | Sept. 6, 1949 |
| 2,587,425 | Adams et al. | Feb. 26, 1952 |
| 2,592,603 | Sanford et al. | Apr. 15, 1952 |
| 2,670,332 | Krebs et al. | Feb. 23, 1954 |